United States Patent [19]

Li et al.

[11] Patent Number: 4,783,738

[45] Date of Patent: Nov. 8, 1988

[54] ADAPTIVE INSTRUCTION PROCESSING BY ARRAY PROCESSOR HAVING PROCESSOR IDENTIFICATION AND DATA DEPENDENT STATUS REGISTERS IN EACH PROCESSING ELEMENT

[75] Inventors: Hungwen Li, Pleasantville; Ching-Chy Wang, Fishkill, both of N.Y.

[73] Assignee: International Business Machines Corporation, Armonk, N.Y.

[21] Appl. No.: 839,311

[22] Filed: Mar. 13, 1986

[51] Int. Cl.⁴ ............................................. G06F 15/00
[52] U.S. Cl. ..................................... 364/200; 382/49
[58] Field of Search ... 364/200 MS File, 900 MS File; 382/49

[56] References Cited

U.S. PATENT DOCUMENTS

| | | | |
|---|---|---|---|
| 3,287,702 | 11/1986 | Borck, Jr. et al. | 340/172.5 |
| 3,287,703 | 11/1986 | Slotnick | 340/172.5 |
| 3,544,973 | 12/1970 | Borck, Jr. et al. | 364/200 |
| 3,970,993 | 7/1976 | Finnila | 340/172.5 |
| 4,187,539 | 2/1980 | Eaton | 364/200 |
| 4,287,566 | 9/1981 | Culler | 364/754 |
| 4,301,443 | 11/1981 | Sternberg et al. | 340/146.3 |
| 4,344,134 | 8/1982 | Barnes | 364/200 |
| 4,380,046 | 4/1983 | Fung | 364/200 |
| 4,398,176 | 8/1983 | Dargel et al. | 382/27 |
| 4,435,758 | 3/1984 | Lorie et al. | 364/200 |
| 4,464,689 | 8/1984 | Sternberg | 382/48 |
| 4,467,409 | 8/1984 | Potash et al. | 364/200 |
| 4,484,346 | 11/1984 | Sternberg et al. | 382/27 |
| 4,541,116 | 9/1985 | Lougheed | 382/49 |
| 4,558,411 | 12/1985 | Faber et al. | 364/200 |
| 4,574,394 | 3/1986 | Holsztynski et al. | 382/41 |

FOREIGN PATENT DOCUMENTS 301600.7 9/1984 European Pat. Off. .

OTHER PUBLICATIONS

Fountain, T. J., "Towards Clip 6–An Extra Dimension", IEEE Computer Society Workshop on Computer Architecture for Pattern Analysis and Image Database Management, Nov. 1981, pp. 25-30.
U.S.S.R. Author's Certificate No. 83-721416/30, Associative Processors Microprogram Control Apparatus, Tbilisi Elva Combin, Sep. 15, 1982.
Davis et al, Systolic Array Chip Matches the Pace of High-Speed Processing, Electronic Design, Oct. 31, 1984, pp. 207-218.

(List continued on next page.)

Primary Examiner—Gareth D. Shaw
Assistant Examiner—Jonathan C. Fairbanks
Attorney, Agent, or Firm—Carl C. Kling; Philip J. Feig

[57] ABSTRACT

Equipping individual processing elements with an instruction adapter provides an array processor with adaptive spatial-dependent and data-dependent processing capability. The instruction becomes variable, at the processing element level, in response to spatial and data parameters of the data stream. An array processor can be optimized, for example, to carry out very different instructions on spatial-dependent data such as blank margin surrounding the black lines of a sketch. Similarly, the array processor can be optimized for data-dependent values, for example to execute different instructions for positive data values than for negative data values. Providing each processing element with a processor identification register permits an easy setup by flowing the setup values to the individual processing elements, together with setup of condition control values. Each individual adaptive processing element responds to the composite values of original setup and of the data stream to derive the instruction for execution during the cycle. In the usual operation, each adaptive processing element is individually addressed to set up a base instruction; it also is conditionally set up to execute a derived instruction instead of the base instruction. An array processor made up of adaptive processing elements can adapt dynamically to changes in its input data stream, and thus can be dynamically optimized, resulting in greatly enhanced performance at very low incremental cost.

7 Claims, 5 Drawing Sheets

OTHER PUBLICATIONS

NCR Geometric Arithmetic Parallel Processor, product specification NCR45CG72, NCR Corp., Dayton, Ohio, 1984, pp. 1–12.

Cloud et al, High Efficiency for Parallel Processors, IEEE Southcon, reprint published by NCR Corporation Microelectronics Div. Fort Collins, CO, pp. 1–7.

J. L. Potter, Image Processing on the Massively Parallel Processor, Computer, vol. 16, No. 1, pp. 62–67.

Masatsugu Kidode, Image Processing Machines in Japan, Computer, vol. 16, No. 1, pp. 68–80.

Stanley R. Sternberg, Biomedical Image Processing, Computer, vol. 16, No. 1, pp. 22–34.

Kai Hwang and King-sun Fu, Integrated Computer Architectures for Image Processing and Database Management, Computer, vol. 16, No. 1, pp. 51–60.

Kendall Preston, Jr., Cellular Logic Computers for Pattern Recognition, Computer, vol. 16, No. 1, pp. 36–47.

Azriel Rosenfeld, Parallel Image Processing Using Cellular Arrays, Computer, vol. 16, No. 1, pp. 14–20.

The TTL Data Book for Design Engineers, Second Edition, Texas Instruments Inc. Bulletin No. DL-S 7712350, pp. 7–471, Bulletin No. DL-S 7611866, pp. 7–316, Bulletin No. DL-2 7711847, pp. 7–181.

ADAPTIVE INSTRUCTION PROCESSING BY ARRAY PROCESSOR HAVING PROCESSOR IDENTIFICATION AND DATA DEPENDENT STATUS REGISTERS IN EACH PROCESSING ELEMENT

BACKGROUND OF THE INVENTION

1. Field of the Invention

This invention relates to image processors which process data streams passing through arrays to processing elements, each processing element executing an assigned instruction, and more particularly relates to an architecture for adaptively manipulating the instruction assignment of each processing element in response to spatial and data values in the data stream, using an instruction adapter, individual to each processing element, to derive a new instruction as a composite function of processor identification and status and of the data stream.

2. Description of the Prior Art

The following publications are representative of the prior art:

U.S. Pat. No. 3,287,702, Borck, Jr., et al, COMPUTER CONTROL, Nov. 22, 1966, shows an array processor with computer control of an array of conventional processing elements.

U.S. Pat. No. 3,287,703, D. L. Slotnick, COMPUTER, Nov. 22, 1966 shows a similar array processor.

U.S. Pat. No. 3,970,993, C. A. Finnila, COOPERATIVE-WORD LINEAR ARRAY PARALLEL PROCESSOR, July 20, 1976 shows an array processor in which each processing element includes a flag register which can modify the operations on the common control lines.

U.S. Pat. No. 4,187,539, J. R. Eaton, PIPELINED DATA PROCESSING SYSTEM WITH CENTRALIZED MICROPROGRAM CONTROL, Feb. 5, 1980 shows a plural dataflow pipelined processor in which each dataflow includes a shift register which provides a sequence of microinstructions, and a common microprogram control unit includes a flag register which helps keep the instruction size small by providing instruction information which does not change often.

U.S. Pat. No. 4,287,566, G. J. Culler, ARRAY PROCESSOR WITH PARALLEL OPERATIONS PER INSTRUCTION, Sept. 01, 1981, shows an array processor having subarrays used to calculate vector addresses.

U.S. Pat. No. 4,344,134, G. H. Barnes, PATRITIONABLE PARALLEL PROCESSOR, Aug. 10, 1982, shows a partitionable array processor in which each processor in a node tree issues a ready signal when the dataflow has passed it, thus invoking the next instruction.

U.S. Pat. No. 4,380,046, L-W. Fung, MASSIVELY PARALLEL PROCESSOR COMPUTER, Apr. 12, 1983, shows an array processor with each processing element equipped with a mask bit register, identified as G-register, to disable the processing element and thus distinguish between executing the current instruction or no-operation; that is, each processing element has a G-register with an OP/NOP flag.

U.S. Pat. No. 4,467,409, Potash et al, FLEXIBLE COMPUTER ARCHITECTURE USING ARRAYS OF STANDARDIZED MICROPROCESSORS CUSTOMIZED FOR PIPELINE AND PARALLEL OPERATIONS, Aug. 21, 1984, shows a flexible architecture for a sequential processor, using standard units with "soft functional structures" which customize a unit for a command. The units thus can be manufactured as standard units and customized by means of a mask which sets contacts in the soft functional structure.

U.S. Pat. No. 4,558,411, Farber et al, POLYMORPHIC PROGRAMMABLE UNITS EMPLOYING PLURAL LEVELS OF SUB-INSTRUCTION SETS, Dec. 10, 1985, shows a multiple-level programmable unit to provide a hierarchy of sub-instruction sets of microprogramming, to change, for example, from input output mode to processing mode or to exchange programs written in differing languages.

European Patent Application No. 84301600.7, Holsztynski, DATA PROCESSING CELLS AND PARALLEL DATA PROCESSORS INCORPORATING SUCH CELLS, Oct. 17, 1984, shows an array processor in which each processing element includes a full adder and storage device for N-S (north-south), E-W (east-west), and C (carry), so that the processing element can carry out both arithmetic and logic functions.

U.S.S.R. Author's Certificate No. 83-721416/30, ASSOCIATIVE PROCESSORS MICROPROGRAM CONTROL APPARATUS, Tbilisi Elva Combine, Sept. 15, 1982, shows first and second control instruction registers in instruction memory to allow the same microinstruction to be used for different instructions, reducing the overall volume of memory.

Davis et al, SYSTOLIC ARRAY CHIP MATCHES THE PACE OF HIGH-SPEED PROCESSING, Elecronic Design, Oct. 31, 1984, pp 207-218, shows a representative array processor.

NCR GEOMETRIC ARITHMETIC PARALLEL PROCESSOR, product specification NCR45CG72, NCR Corp., Dayton, OH, 1984, pp. 1-12, shows physical characteristics of a representative array processor.

Cloud et al, HIGHER EFFICIENCY FOR PARALLEL PROCESSORS, IEEE Southcon, reprint published by NRC Corporation Microelectronics, Div., Fort Collins, CO, pp. 1-7, shows details of operation of NCR's geometric arithmetic parallel processor (GAPP).

The prior art shows a variety of array processors, with individual processing elements controllable externally in a variety of manners, and with the possibility of OP/NOP according to a flag in the individual processing element—but the prior art does not teach the use of instruction adaptation within each individual adaptive processing element to make an array processor dynamically optimizable to spatial and data dependencies through derived instruction within the adaptive processing element.

Current computer systems are categorized, according to instruction stream and data stream, into four classes. They are:

SISD (Single Instruction stream Single Data stream).

SIMD (Single Instruction stream Multiple Data stream).

MISD (Multiple Instruction stream Single Data stream).

MIMD (Multiple Instruction stream Multiple Data stream).

Except for SISD, these architectures are parallel processing systems. However, none of them can perform parallel operations which are adaptive to the spatial condition of a processing element (spatial adaptation, e.g. data are at the border of an image or the processing element is at the first column of an array). Neither can they perform parallel operations adaptive to the nature of the data (data adaptation, e.g. data positive/data negative; flag true/flag false).

Supercomputers are commercially available now and exemplified by the Cyber series from CDC, the CRAY series from CRAY Research and the NEC AP series. All these machines are of MISD architecture and require a long setup time for setting up the instruction pipe to process a vector. The overhead is large if the frequency of the pipe setup is high or the vector is short; the performance is consequently low in such cases.

Data dependence in a loop degrades the performance of these supercomputers. The machines are either prevented from presetting the pipe until the data dependence is resolved (e.g. status is known exactly) or will set up the pipe for one path (e.g., status is true) with higher probability. The former case delays the execution while the latter case involves the resetting of the pipe (i.e. increase the pipe setup frequency) if the "guess" is wrong. Both cases degrade the performance.

The lack of spatial and/or data adaptation leads to the following drawbacks:

1. Data-dependent operations are processed sequentially, which leads toa waste of the parallel hardware, hence to lower performance;
2. Data with spatial significance are treated as exception, which prevent the parallel opportunity;
3. Interconnections of parallel computers are fixed, which restricts the algorithm versatility;
4. Complementary operations (e.g. SEND/RECEIVE pair) caused by data or spatial dependence are performed sequentially, which implies longer execution time;
5. Communication bandwidth is accordingly wasted;
6. Different copies of the program must be generated for processing elements (PEs) with different spatial conditions, which leads to larger software effort.

The prior art does not teach nor suggest the invention, which provides for instruction adaptation at the processing element level for spatial and data dependencies, by providing each of a finite number of processing elements with conditional instruction modification means.

To facilitate a quick understanding of the invention, it is helpful to describe the situations where data-dependent parallel processing and spatial-dependent parallel processing are involved, and where improved solutions, such as by means of the invention, are most desirable.

With adaptive instruction processing, the above problem could be handled in a parallel fashion as follows:

An instruction is defined as $+/-$ (add or subtract) while, using the "status" as the "agreement bit," the derived instruction is defined as $+$ (add) if the "status" is true, or is defined as $-$ (subtract) if the "status" is false. The loop with data dependence can then be rewritten as $$for(i=0; i<300; i++)$$
$$for(j=0; j<500; j++)$$
$$c[i,j]=a[i,j]+/-b[i,j];$$

and parallel processing can be applied efficiently.

This example demonstrates one instance of how data dependence can be resolved, and how the data dependent loops that were processed sequentially can now be parallelized. The opportunity of exploiting the parallelism that involves data dependence is not limited to the above example and is much wider in application.

(1) Data-Dependent Parallel Processing

Current parallel computers are efficient in processing a loop with a long running index, but do not support efficiently the loop with data dependence. Specifically, one type of data independent loop is shown as follows:

$$for(i=0; i<300; i++)$$
$$for(j=0; j<500; j++)$$
$$c[i,j]=a[i,j]+b[i,j];$$

The processing can be very well supported by most known SMID, MISD and MIMD machines.

But when the data dependence is added to the program as shown in the following, no existing parallel machines can handle it efficiently.

$$for(i=0; i<300; i++)$$
$$for(j=0; j<500; j++)$$
if(status)
$$c[i,j]=a[i,j]+b[i,j];$$
else
$$c[i,j]=a[i,j]-b[i,j];$$

(2) Spatial-dependent Parallel Processing

In image processing and other applications where data are associated with spatial conditions, data are not handled homogeneously, but rather are subject to their spatial dependence. For example, the data on the boundary of an image are treated differently from the other non-boundary data; this is one type of spatial dependence reflected by data. In this situation, there are two major drawbacks when applying parallel processing:

1. The degree of parallelism can only be extended to the homogeneous part of the data; consequently, the non-homogeneous data (e.g. boundary) are forced to be processed sequentially. This degrades the performance of a parallel system;
2. The program (or coding) for the non-homogeneous data differs from the program for their homogeneous counterpart; therefore, more than one copy of the coding must be prepared. This leads to larger software effort.

If the instruction could be adapted, processing with the spatial dependence could solve problems such as the above probelm as follows:

$$for(i=0; i<300; i++)$$
$$for(j=0; j<500; j++)$$
if (spatial-condition)
    action 1;
then
    action 2.

With adaptive instructin processing, both drawbacks could be removed. The spatial condition for the non-homogeneity, for example the boundary, could be expressed as conditions such as $x<B$ or $x>N-B$ or $y<B$ or $y > N-B$, where $(x,y)$ is the coordinate of a pixel of an $N \times N$ image and B is the width of the boundary.

SUMMARY OF THE INVENTION

The object of the invention is to provide an image processor architecture which speeds the operation of the image processing system by eliminating delays related to spatial or data dependence.

A feature of the invention is the provision, in each of a finite number of processing elements, of an instruction adapter with addressable instruction derivation means, responsive to the composite of original instruction and bit values in the data stream.

An advantage of the invention is that the image processing system is self-adaptive to the parameters of the data stream, in that an individual processing element may derive different instructions adapted to the spatial or data parameters of different items as the items arrive for processing at the individual processing element.

Another advantage of the invention is that it does not require processing delay time for data dependencies.

The foregoing and other objects, features and advantages of the invention will be apparent from the more particular description of the preferred embodiments of the invention, as illustrated in the accompanying drawings.

DESCRIPTION OF A PREFERRED EMBODIMENT OF THE INVENTION

The adaptive instruction processor assigns a processor identification (PID) to each adaptive processing element in the parallel computer. It collects a set of data-dependent-status (DDS) bits from the arithmetic & logic unit (ALU) of the adaptive processing element. It then uses an Instruction Adapter (IA) to derive the instruction subject to the spatial dependence and data dependence reflected by the PID, DDS and the original instruction.

Figure 1:
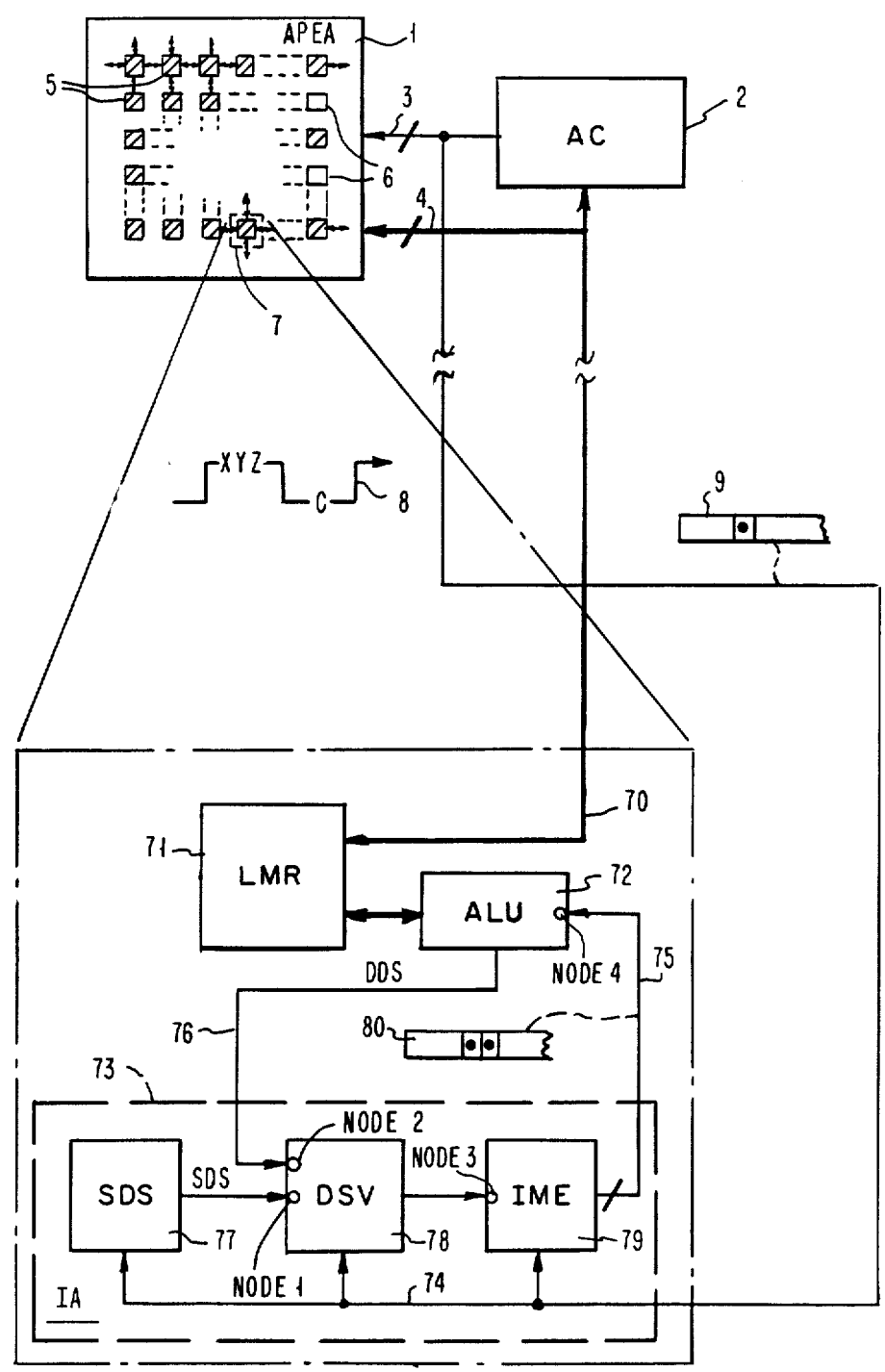
FIG. 1 is a block diagram of an array processor with one representative adaptive processing element presented in block diagram according to the invention.

FIG. 1 shows the array processor, which is similar in concept and operation to array processors known in the art, except insofar as handling of data dependencies and spatial dependencies is concerned. The image processor comprises adaptive processing element array 1 and array controller 2, both of which are shown schematically. Array controller 2 provides a set of instructions on instruction line 3, and provides a communication path 4 for input and output data. Processing element array 1 contains a great number of individual adaptive processing elements 5, each of which is equipped for adaptation according to this invention. Processing element array 1 might contain conventional processing elements 6, so long as there is awareness of which type of processing element is in each location, and housekeeping is done accordingly, but this is not preferred. It is preferred to make all the processing elements identical adaptive processing elements, and where conventional performance is desired, to adapt those elements, for example, those identified as elements 6, to perform conventionally.

Image processing proceeds in conventional image processor fashion so far as dataflow is concerned; data enter the processing element array and flow from processing element to processing element in accordance with initial data values as modified by processing elements through which the data pass, without intervening access to system memory. The individual processing elements are set up prior to dataflow commencement. If a conventional image processor, there is little chance to alter the setup during execution because for all practical purposes the exact position of data during execution is unknown. In essence, an image processor, once set up, is for the duration of the execution a specialized, fixed operation computer. This invention provides for dynamic changes of setup during execution, by equipping each of the multiplicity of adaptable adaptive processing elements with its own processor identification register, its own data dependent status register, and its own instruction adaptation mechanism which is responsive to the composite of processor identification data, status data, and the applied instruction to provide internal selection of operation for the adaptive processing element. On a system basis, this provides convenient adaptation to spatial and data dependencies, which permits system optimization for the type of data being processed.

A representative one of the many adaptive processing elements 5, adaptive processing element 7, is shown in greater detail. Communication path 70, local memory 71, and arithmetic and logic unit (ALU) 72 are conventional, similar in scope and effect to the analogous items in a conventional processing element. In general, these items can function to accept an assignment (instruction) and execute the assignment on each item of data as it is presented.

The computation cycle, shown simplified in time line 8, uses an original instruction, shown simplified in original instruction view 9, to derive an instruction for execution. In operation, the original instruction, spatial dependent status and data dependent status values are available early in a cycle, as shown by values X,Y,Z on time line 8. The derived instruction then becomes available for control of computation C.

Adaptability is provided by instruction adapter (IA) 73, which accepts from original instruction line 74 an instruction invoking adaptability, performs appropriate tests on data as presented, determines from test results whether to adapt by deriving a substitute instruction, and provides the substitute derived instruction to ALU 72 on derived instruction line 75. The ALU includes or serves as a data dependent status register to provide freshly processed data dependent status bits back on DDS test data line 76 to IA 73. The adaptability invoking instruction, presented on adaptability control line 74, is made available to spatial dependent status block (SDS) 77, to dependence select and verify block (DSV) 78, and to instruction modify and extend block (IME) 79. The instruction adapter (IA) block 73 accepts an original instruction (of the type which invokes its own modification under specified circumstances) and generates, as output, a derived instruction on line 75 to ALU block 72. This controls the operations of the adaptive processing element.

A typical instruction set, such as that shown in NCR-45CG72, 1984, at page 7, includes a micro-NOP instruction, several load/store instructions for inter-processing-element communication, and arithmetic/logic operations. FIG. 1 illustrates the instruction format of the derived instruction at inset derived instruction view 80. The derived instruction has an "agreement bit" inserted to the input instruction in one or more prescribed bit positions. The "agreement bit" is a function of the PID, DDS and the input instruction while the "prescribed bit position" can be predetermined from the format of the input instruction and derived instruction. The "agreement bit" can also overwrite the bits of the input instruction at the prescribed positions.

The individual adaptive processing element remains quite simple. Three major building blocks are registers, shift registers and multiplexers, all of which are common parts available from a number of suppliers and familiar to those skilled in the art. Such parts are described in THE TTL DATA BOOK FOR DESIGN ENGINEERS, Second Edition, Texas Instruments Corporation, LCC4112 74062-116-AI, pp. 7-471;7-316; and 7-181. The following examples are typical of building blocks appropriate for selection:

| Part Number | Building Block |
|---|---|
| 74374 | 8-bit register |
| 74194 | 4-bit bidirectional shift register |
| 74157 | multiplexer |

Figure 2:
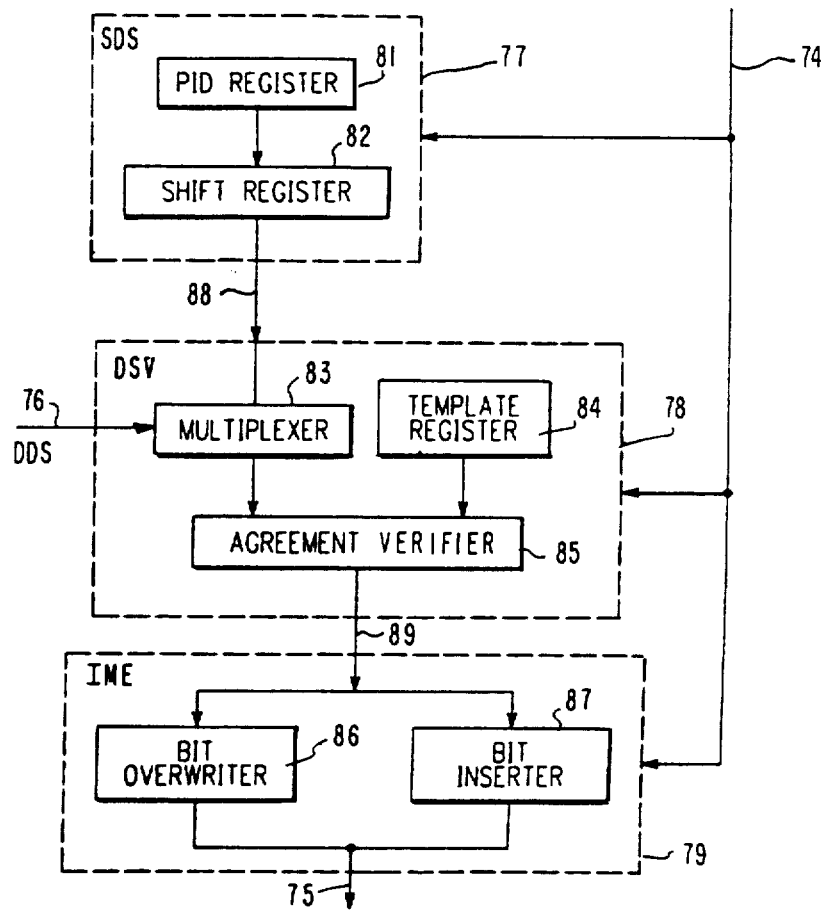
FIG. 2 is a detailed block diagram of the instruction adapter IA of FIG. 1.

FIG. 2 shows the structure of the instruction adapter (IA) 73, which contains three functional blocks as follows:

1. Spatial dependent status block (SDS) 77;
2. Dependence select and verify block (DSV) 78; and
3. Instruction modify and extend block (B) 79.

The Spatial Dependence Status (SDS) block 77 accepts part of the input instruction as control and produces SDS bits as output to indicate the spatial dependence. This block contains a PID register 81 whose content is the PID of the PE. The PID register can be preloaded by the input instruction. The content of the PID register 81 must be correlated to spatial location, for example x-y coordinates. It also contains a shift register 82 of the same size as PID register 81. The shift register 82 can perform a logic-shift operation, one bit at a time, in either direction. This mechanism allows for any bit group of the PID register to be available on line 88 as the input to the DSV block 78.

The second functional block is the "Dependence Select and Verify (DSV)" block 78. The DSV block 78 contains a multiplexer 83 to select some of the SDS bits or DDS bits. A template register 84 is included in this block for matching, masking and comparing purpose. The selected dependent bits and the template are passed to the "agreement verifier" 85 to generate an "agreement bit." Template register 84 contains decision threshold information, preset at initalization. In a typical operation, all template registers are set to the same value to mask a certain subgroup of bits. On a particular cycle, all shift registers are operated similarly, according to instruction, to accomplish sampling of a group of bits in the related PID register and align those bits appropriately.

The template register and shift register together function so as to select the interested bits from the PID.

The usual operation is as a movable window, including two consecutive bits to assign the hardware differently for different items of interest or different image subsets.

The agreement verifier can perform COMPARE, AND, OR and XOR operations. In summary, the DSV block accepts SDS bits and DDS bits as input, and generates the "agreement bit" as output. The DSV block accepts part of the input instruction as control.

The DDS bits indicate the nature of the data and are used for data adaptation. Common DDS bits include positive/negative, zero/non-zero, positive/nonpositive, true/false, greater/equal/less, even/odd. Any other status that can be derived from the Arithmetic Logic Unit (ALU) 72 of the adaptable processing element 7 can be identified by status bits.

The third block is the "instruction modify and extend (IME)" block 79. The IME block 79 accepts the agreement bit and the input instruction as inputs, and generates the derived instruction as output. The IME block 79 has a "bit overwriter" to replace some bits of the input instruction by the agreement bit at the prescribed positions. The block also has a "bit inserter" which inserts the agreement bit into the input instruction at the prescribed positions. The selection of overwriting or insertion or both, and the prescribing of the positions, are controlled by part of the input instruction.

With these three functional blocks, the IA can perform the following "dependent operations" to facilitate the spatial and/or data adaptation:

(1) detecting any one bit of DDS being "1";
(2) detecting the i-th bit of the PID register being "1"; and
(3) detecting any M contiguous bits of the PID register matching to the template where M is smaller or equal to the total number of bits of the PID.

The above-described generic embodiment encompasses the invention. Specific implementations can be a partial collection of each functional block.

Implementation of Simplified Adaptive Processing Element

Figure 3:
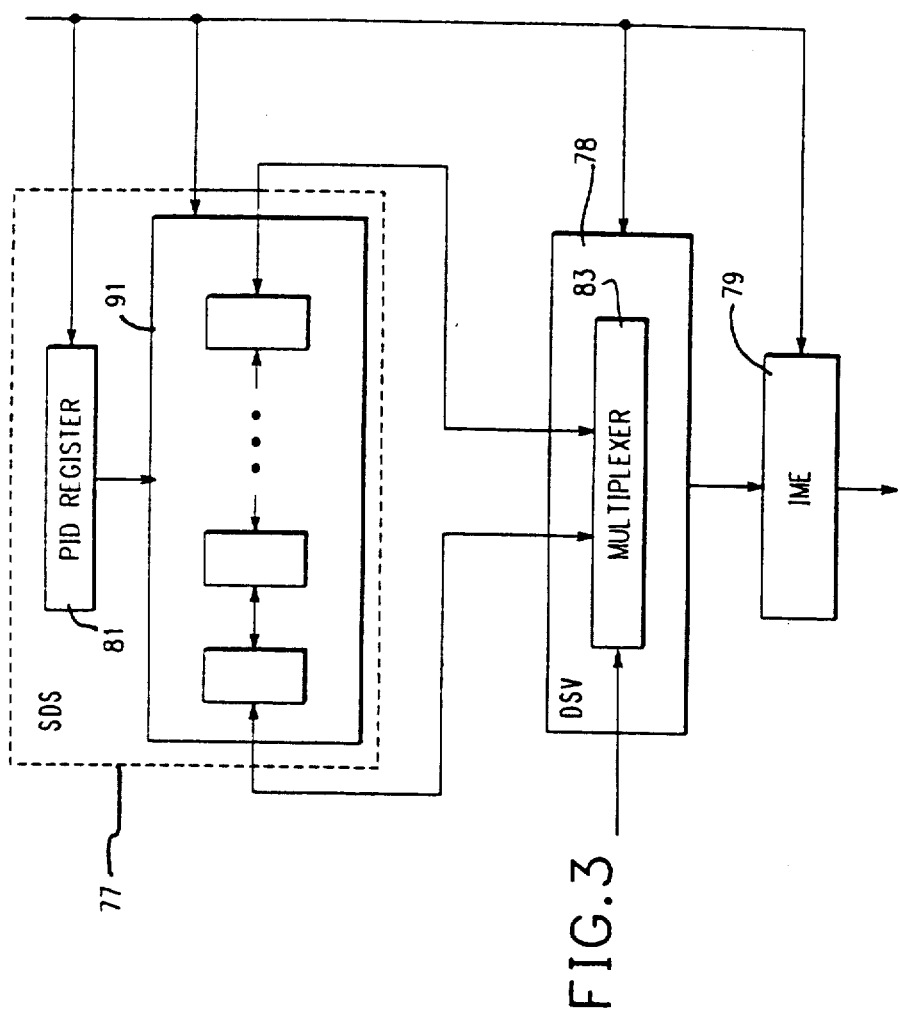
FIG. 3 is a detailed block diagram of an instruction adapter according to a simplified embodiment.

A very efficient simplified implementation of the Instruction Adaptor (IA) 73 is illustrated in FIG. 3. The content of the PID register 81 is copied to a logic shift register (LSR) 91 which can perform logic-shift operations in both directions. The bits shifted out from them and the rightmost bit of the logical shift-register 91 are the SDS bits. A multiplexer then selects one of the SDS or DDS bit as the agreement bit. Such an implementation can perform one dimensional and two dimensional operations. This implementation is suitable for an adaptive processing element with less complexity, because of the elimination of the template register 84 (FIG. 2) and the agreement verifier 85.

Implementation for Multidimensional Network

Figure 4:
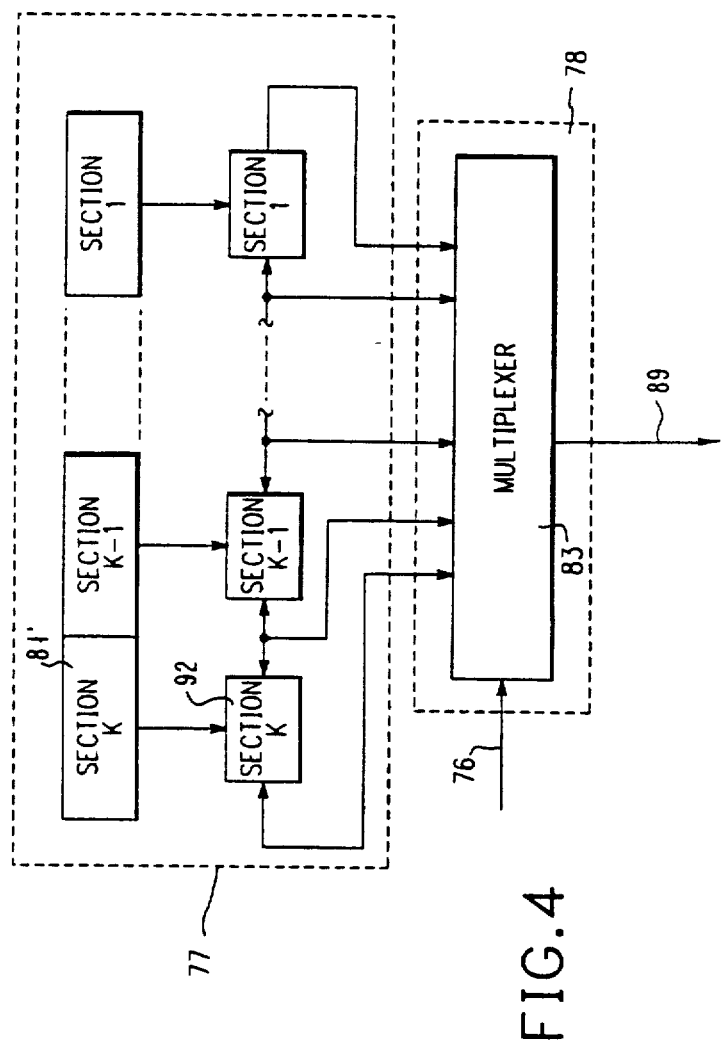
FIG. 4 is a detailed block diagram of the instruction adapter for a multidimensional network array processor.

FIG. 4 shows the spatial dependent status block generalized to detect signal dependence of a multidimensional interconnection network of a parallel computer, such as an array in 2D or a pyramid in 3D. The PID register may be considered as comprising K sections 1-K. The shift register 92, which is analogous to the shift registers 82 and 91 in FIGS. 1-2, in SDS block 77, is partitioned into K sections, where K is the dimension of the network. Each section manipulates the spatial dependence for one dimension of the network. The rightmost and the leftmost bits of each section are SDS bits which are passed to the multiplexer 83 in the DSV block 78 for spatial dependence detection.

APPLICATIONS AND BENEFITS

(1) Data-Dependent and Spatial-Dependent Parallel Processing

With adaptive instruction processing according to the invention, one can restructure as follows:

```
for (i=0; i<300; i++)
    for (j=0; j<500; j++)
        if (condition)
            action 1;
        else
            action 2; (if action 1 and action
            2 are complementary)
                    into
for(i=0; i<300; i++)
for(j=0; j<500;j++)
    action 3.
```

Complementary operations are possible. An example of the complementary operation is the +/− (add/subtract) pair. The "agreement" bit is derived from the "condition," which can be data-dependent or spatial-dependent. As the result of the restructuring, the sequential execution of action 1/action 2 can be totally parallelized into one unified action 3.

The problem can also be restructured in the following way:

An "agreement" bit is derived from the "condition" and is used to generate an "address offset" by either overwriting or inserting the appropriate field of the input instruction. The code for action 1 and action 2 are then structured D distance apart where D is equal to the "address offset." During the runtime, each PE will "jump" to the right entry of the code according to the spatial condition of the data. Note that only one version of the coding is necessary. A non-homogeneous problem due to the spatial dependence can be converted to a homogeneous one by this invention, so that the degree of parallelism can be more extensive and software effort can be reduced.

(2) Universal Network Emulation

This invention resolves the spatial dependence due to the relative or absolute position (or coordinate) of PEs in a parallel computer which has one single fixed baseline network to connect the PEs in the system.

It is advantageous from an algorithm development point of view to have more than one network (or interconnection) embedded in a parallel processing system, because no single network optimally matches to various algorithms. In a parallel system with such network emulation capability, a network can be emulated from the baseline interconnection via using the adaptive instruction processor.

For example, the pyramid network can be emulated from the baseline array interconnection of size N×N by the adaptive instruction processor. The PID register of each adaptive processing element in the array is loaded with the appropriate Cartesian coordinate value (x, y). At time t=1, all PEs are active. At t=2, only adaptive processing elements with x or y equals to the multiple of 2 are active. At t=3, only adaptive processing elements with x or y equals to the multiple of 4 are active. In summary, at t=i only adaptive processing elements with x or y equals to the multiple of 2×(i−1) are active. The abovedescribed procedure emulates a pyramid network of shrinkage 2 (i.e. for every further time step, only ¼ of the total PEs are connected with distance one) from the baseline array network. The control of the emulsion can be done by examining the content of the two-dimensional PID register and activates the PE is the "agreement" bit is true.

The same adaptive instruction processor can also be applied to the emulation of networks such as tree, ring and perfect shuffle etc. from a baseline interconnection.

The netwok emulation is a very powerful mechanism in producing multiple parallel architectures from a single PE type. Along with the economic and logistic benefits, the algorithm can have a better match to the architecture, so that the performance can be increased. Because only one element type is required, such emulation scheme is especially suitable for VLSI implementation.

(3) Complementary Operations

A complementary operation is a pair of operations that can be distributed between two adaptive processing elements and executed simultaneously. Examples of complementary operations include the SEND/RECIEVE pair for interprocessor communication and the Butterfly computation of FFT (Fast Fourier Transform). Another example is the +/− instruction described in application (1). When applied to the complementary operations, the adaptive instruction scheme can speed up the execution and save communication bandwidth.

Consider the SEND/RECEIVE example for the SIMD array architecture. One adaptive processing element (based on the knowledge of its position in the array, i.e., spatial knowledge) sends data through an interconnection to its neighbor PE while its neighbor PR (based on this spatial knowledge) receives these data through the same interconnection. The operation can be accomplished in one cycle using one unit of communication bandwidth for one datum. For the SIMD architecture without topology-dependent adaptation, the same operation needs two execution cycles and/or two units of communication bandwidth.

In the case of Butterfly computation, sequential execution in a conventional image processor may require 4 cycles. With the adaptive instruction processor, it can be reduced to 2 cycles, (with 2 adaptive processing elements) or even to 1 cycle (with 4 adaptive processing elements). This is achieved by first sending the instruction ADD/SUB to all adaptive processing elements. Each adaptive processing element then maps the instruction into either ADD or SUB according to its spatial condition.

Application of complementary operations are not limited to the above examples. In fact, many other applications can be found in image processing, computer vision, digital signal processing, mathematical transformation and general scientific computation.

(4) Adaptive Supercomputer

Adaptive instruction processing can resolve the data dependent problem and increase the performance of a supercomputer. An instruction called OPA/OPB (operation A or operation B) can be defined and one agreement bit selected to adapt the instruction. The derived instruction will execute OPA if the agreement bit is "1" or OPB if the agreement bit is "0". The pipe within the supercomputers can be set up in advance for instruction OPA/OPB and the vector execution can be started once the agreement bit is available. The probability of "guessing right" is always "1" because of the data adaptation.

EXAMPLE ILLUSTRATING THE INVENTION

This example illustrates the adaptive instruction processor operating in a spatial adaptation case. With the aid of FIG. 5, this example shows how an original instruction is modified as a function of the Processor IDentification (PID). As a result, the following computation

```
for(i=0; i<300; i++)
  for (j=0; j<500; j++)
    if(PID<0> = = 1)
      c[i,j] = a[i,j] + b[i,j]
    else
      c[i,j] = a[i,j] − b[i,j]
``` can be executed efficiently.

Figure 5:
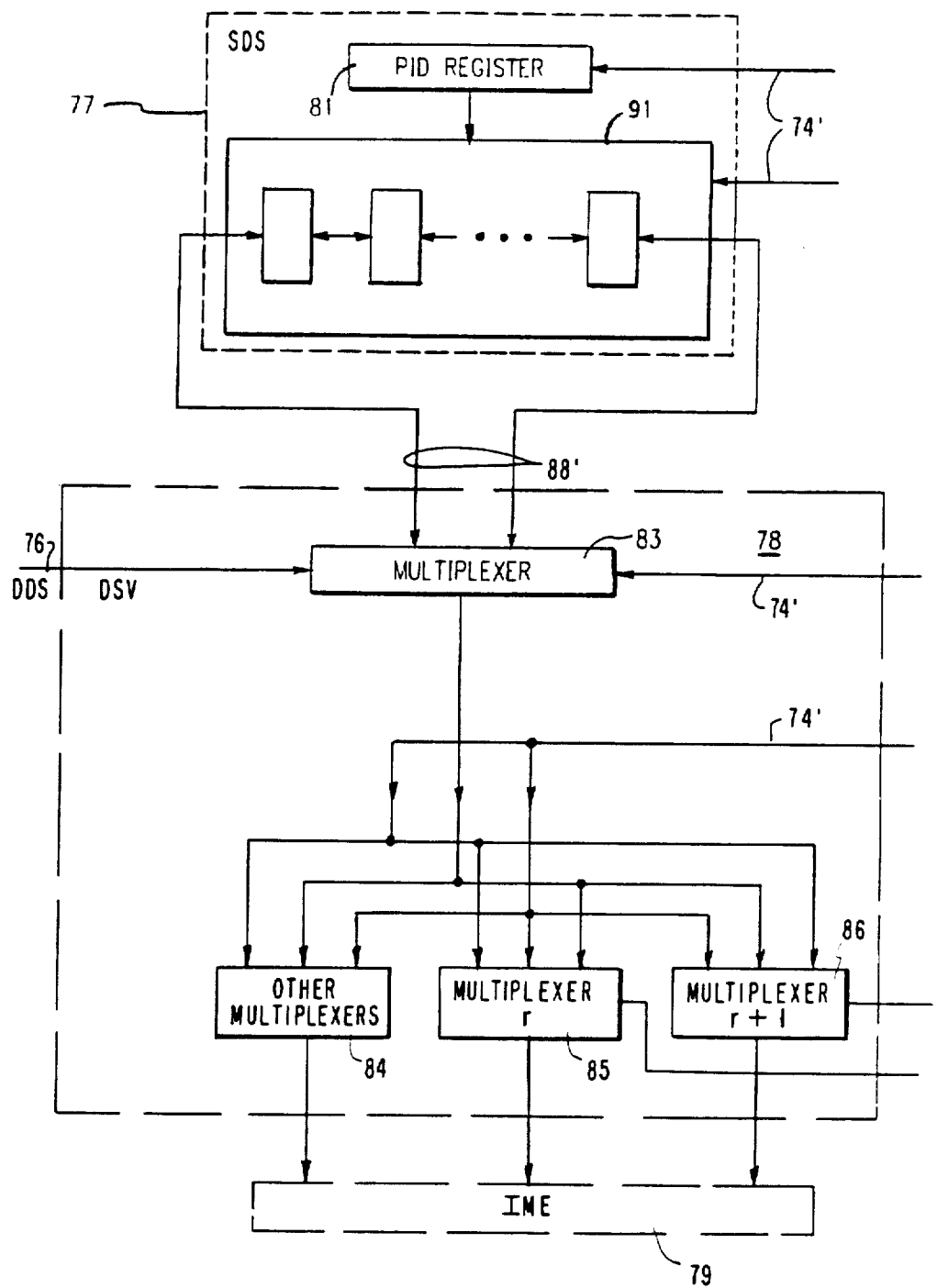
FIG. 5 is a detailed block diagram of a further embodiment of the instruction adapter.

A simplified original instruction and derived instructions are depicted first as a background; then a design realizing the invention is detailed in FIG. 5 with companion description.

Instruction Format

Among the M bits of the original instruction, the K-th bit controls the action of either SEND/REC or +/− as described below:

If bit$<K>$ =1, then PE performs SEND when the PE's local status S is true; PE performs REC when the PE's local status S is false;

If bit$<K>$ =0, then PE performs "+" when PE's local status S is true; PE performs "−" when the PE's local status S is false.

In contrast to the original instruction, the derived instruction has two bits, the r-th and the r+1-th bit, pertinent to this example. The action of the adaptive processing element is prescribed as follows:

| r-th | r+1-th | action |
|---|---|---|
| 0 | 0 | − |
| 0 | 1 | + |
| 1 | 0 | REC |
| 1 | 1 | SEND |

For instance, the PE performs "+" when the r-th bit of the modified instruction is "0" and the r+1-th bit is "1."

A Sample Design for the Invention

FIG. 5 shows another embodiment using multiple multiplexers. A portion of the original instruction commands the shift register 91, which contains the processor identification PID, to SHIFT RIGHT one bit position; as a result, the least significant bit in the processor identification register (LSBPID) is placed in one of the inputs to the Dependence Selection and Verify (DSV) Block 78.

FIG. 5 illustrates a sample design to translate the K-th bit (I$<K>$) of the original instruction into the r-th and the r+1-th bits (IM$<r>$ and IM$<r+1>$) of the modified instruction according to the Least Significant Bit of PID (LSBPID, i.e. PID$<0>$).

Another portion of the original instruction on adaptability control lines 74' then commands the DSV block 78 to SELECT the LSBPID as the output of the multiplexer in DSV Block. Consequently, LSBPID is placed on the line of "agreement bit."

As the inputs of the Instruction Modify and Extend (IME) Block 79, the "agreement bit" (now carrying the LSBPID) and the original instruction (carrying I$<K>$ and other bits) are routed into a set of multiplexers 84–86 to produce the derived instruction. J multiplexers are required for a J-bit derived instruction, one multiplexer to produce one bit of the derived instruction. To produce IM$<r>$, the original instruction command the "multiplexer r" to SELECT I$<K>$ as the output. Similarly, the original instruction commands "multiplexer r+1" to SELECT the "agreement bit" as IM$<r+1>$.

A table below shows the relationship among the original instruction (I$<K>$), the LSBPID and the modified instruction (IM$<r>$ and IM$<r+1>$), which demonstrates the realization of the invention via the design illustrated in FIG. 5.

|  | I$<K>$ | LSBPID | IM$<r>$ | IM$<r+1>$ |
|---|---|---|---|---|
| "−" | 0 | 0 | 0 | 0 |
| "+" | 0 | 1 | 0 | 1 |
| REC | 1 | 0 | 1 | 0 |
| SEND | 1 | 1 | 1 | 1 |

Thus, while the invention has been described with reference to a preferred embodiment, it will be understood by those skilled in the art that various changes in form and details may be made without departing from the scope of the invention.

What is claimed is:

1. An array processor having a control unit with instruction issuing capability and having an array of individual processing elements for processing data according to instructions applied simultaneously to processing elements by the control unit, each processing element having input means, processing means, and output means connected to other processing elements characterized in that each of the processing elements is adaptive, in that each adaptive processing element receives an original instruction, generates a derived instruction and executes the derived instruction, each adaptive processing element comprising:

means for generating a derived instruction as a composite function of the original instruction and dynamic operational parameters by replacing bits in the original instruction; and means to execute said derived instruction.

2. An array processor having a control unit with instruction issuing capability and having an array of individual processing elements for processing data according to instructions applied simultaneously to processing elements by the control unit, each processing element having input means, processing means, and output means connected to other processing elements characterized in that each of the processing elements is adaptive, in that each adaptive processing element receives an original instruction, generates a derived instruction and executes the derived instruction, each adaptive processing element comprising:

means for generating a derived instruction as a composite function of the original instruction and dynamic operational parameters by inserting a bit into the original instruction; and means to execute said derived instruction.

3. An array processor having a control unit with instruction issuing capability and having an array of individual processing elements for processing data according to instructions applied simultaneously to a significant number of processing elements by the control unit, each processing element having input means, processing means, and output means connected to other processing elements
characterized in that
each of the processing elements is adpative, in that each adaptive processing element receives an original instruction, generates a derived instruction and executes the derived instruction, each adaptive processing element comprising:
spatial dependent status means (77) coupled for receiving said original instruction for providing a first signal indicative of a spatial dependent status operational parameter at a first node;
execution means, including the processing means (72), to execute the derived instruction and to provide a result to the output means and also to provide a second signal indicative of a data dependent status operational parameter at a second node;
dependence select and verify means (78), coupled for receiving said original instruction and coupled to said first node and said second node for receiving said first signal and said second signal for deriving at a third node an instruction as a composite function of said original instruction, said first signal and said second signal; and
instruction modification and extension means (79), coupled for receiving said original instruction and coupled to said third node for receiving the composite instruction for providing said derived instruction to the processing means.

4. An array processor according to claim 3, in which said spatial dependent status means (77) comprises a processor identification register (81);
in which said processing means (72) comprises data dependent status register means; and
in which said instruction modification and extension means (79) is coupled to said processing means (72) to provide processing activity which is a composite function of said original instruction and the data content of said processor identification register and the data content of said data dependent status register means.

5. An array processor according to claim 3, wherein said spatial dependent status means comprises:
a processor identification register (81) and a shift register (82);
and wherein said dependence select and verify means (78) comprises a template register (84) and an agreement verifier (85),
whereby said processor identification register, said shift register and said agreement verifier serve as a movable window for providing bits for controlling generation of the derived instruction by the adaptive processing element.

6. An array processor according to claim 3, wherein said spatial dependent status means comprises:
a processor identification register (81') divided into sections 1 . . . K−1, K and a shift register means (92) similarly divided into sections 1 . . . K−1, K and interconnected section by section with said processor identification register (81').

7. An array processor according to claim 3, wherein said dependence select and verify means comprises a plurality of multiplexers arrayed to provide as an output agreement bit values as a composite function of said original instruction and data values to said instruction modification and extension means (79).

* * * * *